United States Patent [19]

Dhoore et al.

[11] 4,235,303
[45] Nov. 25, 1980

[54] COMBINATION BULK ABSORBER-HONEYCOMB ACOUSTIC PANELS

[75] Inventors: Louis G. Dhoore, Seattle; William H. Schultz, Bellevue, both of Wash.

[73] Assignee: The Boeing Company, Seattle, Wash.

[21] Appl. No.: 962,714

[22] Filed: Nov. 20, 1978

[51] Int. Cl.³ .................... B64D 33/02; E04B 11/00
[52] U.S. Cl. .................................. 181/214; 181/222; 181/286; 181/292
[58] Field of Search ............... 181/214, 217, 218, 222, 181/286, 288, 291, 292, 269, 210, 290; 428/116, 117, 118

[56] References Cited

U.S. PATENT DOCUMENTS

| | | |
|---|---|---|
| 2,826,261 | 3/1958 | Eckel . |
| 3,166,149 | 1/1965 | Hulse et al. ........................ 428/118 |
| 4,084,367 | 4/1978 | Saylor et al. ....................... 181/292 |
| 4,111,081 | 9/1978 | Hilliard et al. ..................... 181/210 |
| 4,130,175 | 12/1978 | Hehmann ........................... 181/291 |
| 4,137,992 | 2/1979 | Herman ............................. 181/269 |

Primary Examiner—L. T. Hix
Assistant Examiner—Benjamin R. Fuller
Attorney, Agent, or Firm—Christensen, O'Connor, Johnson & Kindness

[57] ABSTRACT

Combination bulk absorber-honeycomb acoustic panels particularly adapted for use in the inlet and fan air duct of a fan jet engine are disclosed. Each panel comprises a broadband noise-suppressing bulk absorber layer mounted between a back sheet and a perforated septum; and, a narrow band noise-suppressing honeycomb layer mounted between the septum and a perforated face sheet. The panels are mounted in an engine such that the perforated face sheet interfaces with airflow in the inlet or the fan air duct, as the case may be, whereby the face sheet, honeycomb layer and septum protect the bulk absorber from deterioration by isolating the high speed inlet and fan air duct airflows from the bulk absorber layer.

22 Claims, 8 Drawing Figures

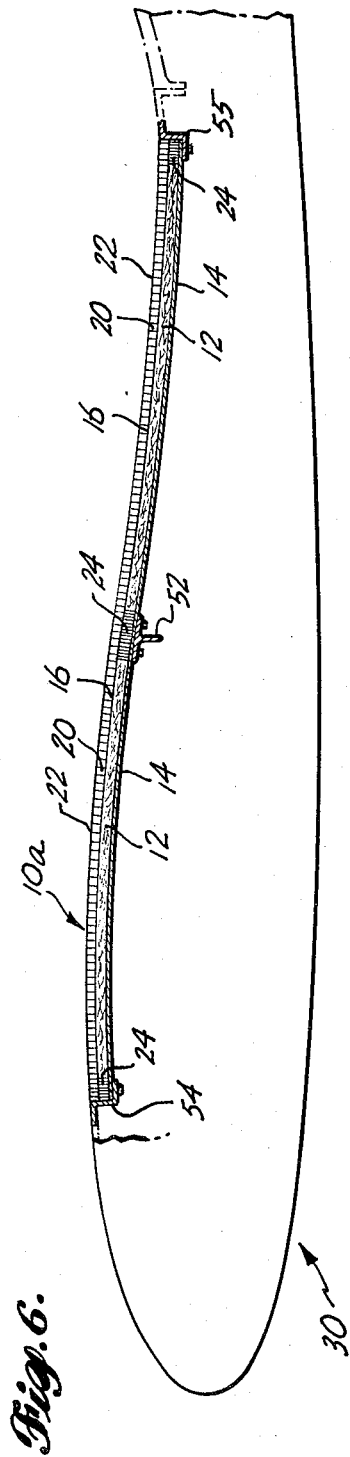
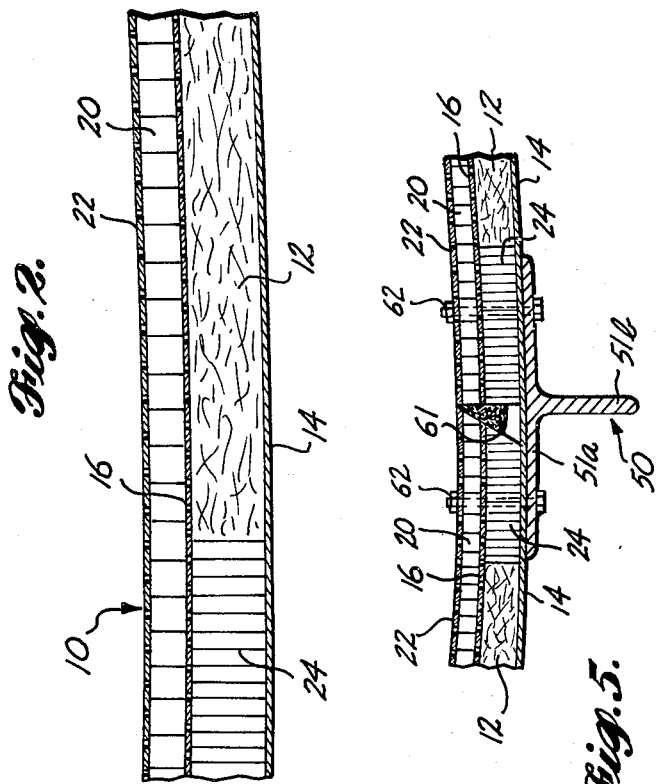
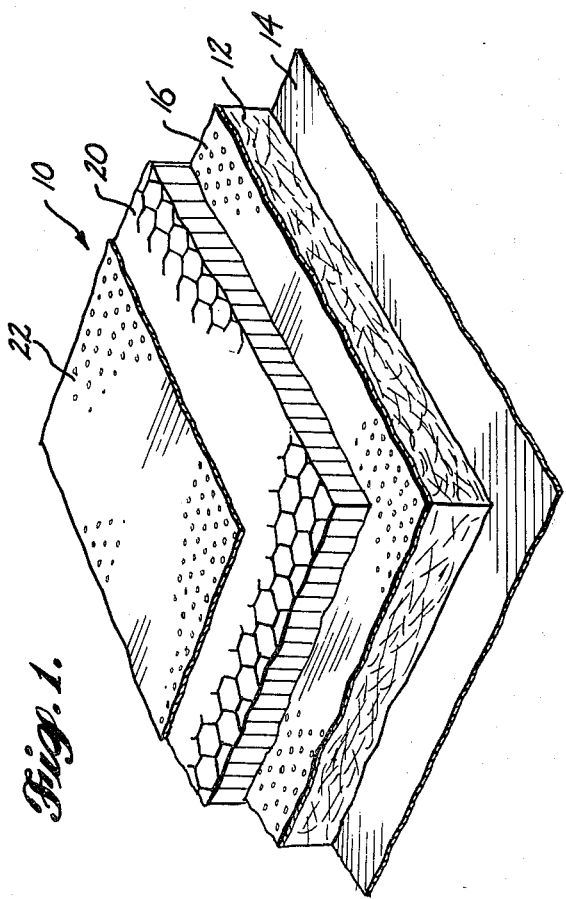

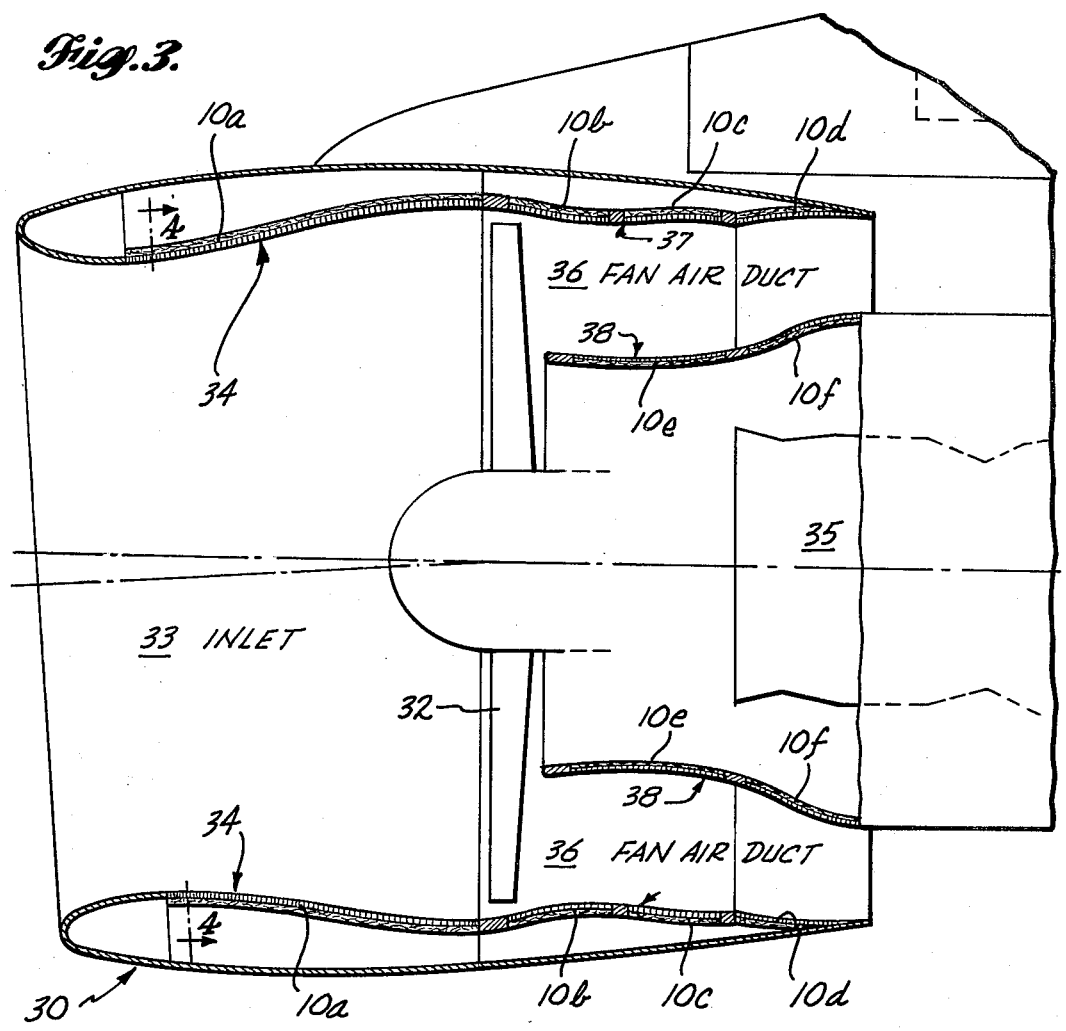
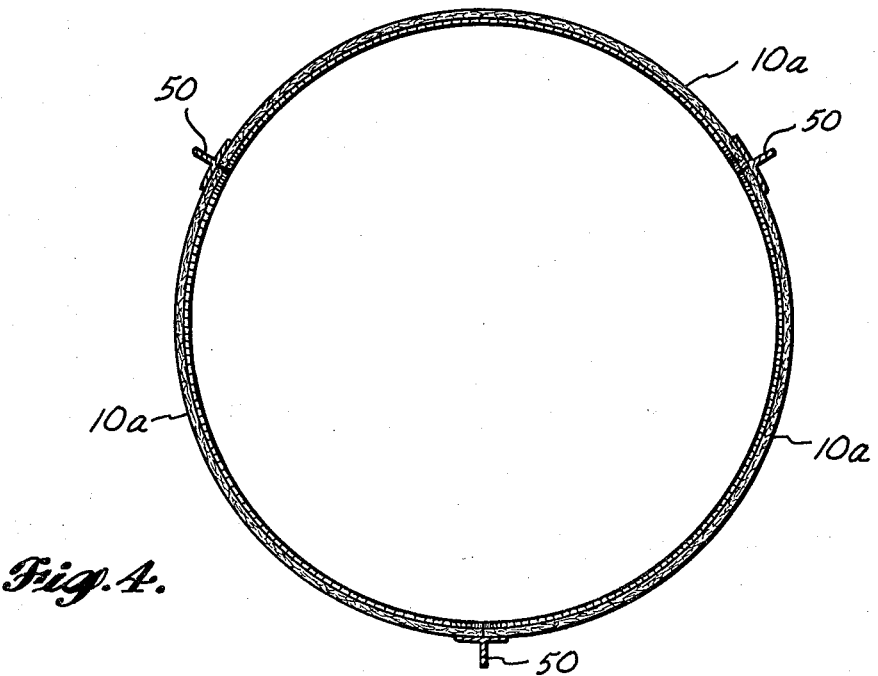

Fig. 7.

| | THICKNESS | % OPEN AREA (AFTER ASSEMBLY) | DENSITY |
|---|---|---|---|
| BULK ABSORBER | GREATER THAN .45 INCH | | 6-9 lbs/ft³ |
| SEPTUM SHEET | 0.02 - 0.05 INCH | 10 - 20 % | |
| HONEYCOMB LAYER | 0.125 - 0.75 INCH | | |
| FACE SHEET | 0.03 - 0.07 INCH | GREATER THAN 19% | |

Fig. 8.

| LOCATION | FACE SHEET | | | HONEYCOMB LAYER | | | SEPTUM | |
|---|---|---|---|---|---|---|---|---|
| | THICKNESS (IN.) | HOLE DIAMETER (IN.) | PERCENT OPEN AREA (%) | DEPTH (IN.) | CELL SIZE (IN.) | THICKNESS (IN.) | HOLE DIAMETER (IN.) | PERCENT OPEN AREA (%) * |
| INLET PANELS (ALL) | 0.050 | 0.050 | 33 | 1/4 | 3/8 | 0.032 | 0.032 | 14 |
| INTERSTAGE PANELS | 0.040 | 0.045 | 34 | 1/2 | 3/8 | 0.032 | 0.050 | 12 1/4 |
| INNER FAN CASE PANELS | 0.040 | 0.045 | 34 | 3/8 | 3/8 | 0.032 | 0.050 | 12 1/4 |
| OUTER FAN CASE PANELS | 0.062 | 0.065 | 26 | 1/2 | 3/8 | 0.032 | 0.050 | 12 1/4 |
| FAN DUCT PANELS (BOTH SLEEVE AND DIAPHRAGM) | 0.040 | 0.045 | 34 | 1/2 | 3/8 | 0.032 | 0.050 | 12 1/4 |

* VALUE PRIOR TO ASSEMBLY
(THE BULK ABSORBER CONSISTED OF 44 OUNCE PER SQUARE YARD KEVLAR COMPRESSED TO 1/2 INCH DEPTH AT ALL LOCATIONS.)

COMBINATION BULK ABSORBER-HONEYCOMB ACOUSTIC PANELS

TECHNICAL FIELD

This invention relates acoustic panels, and more particularly to acoustic panels suitable for use in turbine engines to suppress noise.

BACKGROUND OF THE INVENTION

In some ways, jet aircraft symbolize a traditional conflict between technological progress and individual rights and privacy. On one hand, development of jet powered transport aircraft has been a giant step forward in improving airline convenience by shortening the transit time between cities and countries. On the other hand, because the turbine engines used by such aircraft have been noisy, especially during takeoff and landing, jet aircraft annoy people in communities located in the vicinity of airports. As a result, there is a continuing worldwide concern about the noise produced by turbine engines. Sensitive to this concern, aircraft and engine manufacturers have developed, and are continuing to develop, noise-suppression devices adapted to reduce engine noise. (As used herein, turbine engines include turbo-prop, turbo-fan and turbojet engines.)

Most modern aircraft are powered by fan-jet engines, which have a number of noise sources. These noise sources contribute to various noises having different frequency characteristics. As turbine engine noise has become better understood, various types of noise have been given identifying names. Of the identified types of noise, the major contributors to noise during takeoff and landing are denoted buzz saw, forward generated fan and aft generated fan noise. The name buzz saw is generally associated with noise covering a broad frequency band, for example from 50 to 2400 Hertz, produced a series of tones 50 to 60 Hertz apart. The names forward and aft generated fan noise are generally associated with discrete tones covering narrow frequency ranges that are primarily emitted from the front and rear of the engine respectively. For example, foward generated fan noise may be a discrete tone having a center frequency of about 2,200 Hertz, plus harmonics thereof. Attempts have been made to attenuate the aforementioned types of noises by lining selected regions of the inlet and fan air duct of fan-jet engines with various types of noise absorbing acoustic panels. In the past, the principal noise absorbing acoustic panels used in such turbine engines have been single or multilayer cellular acoustic panels.

While bulk absorber panels have been tested for use in turbine engines, for various reasons previous designs have been found to be unacceptable for use in production engines. More specifically, the bulk absorber panels previously tested in jet engines have excellent broadband noise attenuation characteristics in the range from about 50 to about 4,000 Hertz. A typical bulk absorber panels includes a layer of bulk absorber material mounted between a back sheet and a perforated face sheet. The perforated face sheet allows sound to enter the bulk absorber material. The face sheet, in combination with the back sheet, gives the bulk absorber panel a limited amount of structural stiffness. One disadvantage of bulk absorber panels is that when they are located in a high speed airflow region, such as the inlet and fan air duct of a fan-jet engine, the openings in the face sheet allow air and contaminants to impinge on the bulk absorber material. Contaminants can change or destroy the acoustic properties of the bulk absorber material. Turbulence and high speed air flows in close proximity to the bulk absorber material can cause it to disintegrate and be carried out of the panel through the openings in the face sheet. Not only are the noise attenuation characteristics of the bulk absorber material destroyed by this process, the disintegrated bulk absorber material can be harmfully sucked into the high pressure sections of the engine. Because of this susceptibility to break down, bulk absorber linings have found little use in production aircraft engines.

Another problem with bulk absorber panels is that the structural stiffness provided by only a perforated face sheet and a back sheet is inadequate to permit such panels to be effectively utilized in turbine engines. More specifically, because of the limited structural stiffness of bulk absorber panels, many structural members are required to ensure that the panels are structurally secure within the jet engine inlet and fan air duct. The many structural members needed to support the bulk absorber panels have the obvious disadvantage that they add considerable unwanted weight to the engine. In addition, the structural members have the disadvantage that they result in a significant loss of effective acoustical area and, thus, loss in the amount of noise that can be absorbed or attenuated. That is, structural stiffeners do not, of course, have noise absorbtion qualities. Rather, they form hard noise reflecting surfaces.

In an attempt to increase the stiffness of bulk absorber panels, bulk absorber material has been mounted in the cells of a honeycomb layer mounted between a back sheet and a perforated face sheet. (See U.S. Pat. No. 3,095,943 entitled "Acoustical Structure" and U.S. Pat. No. 3,380,552 entitled "Acoustical Panel With Honeycomb Core and Ventilation Passages".) The disadvantage of mounting bulk absorber material within the cells of the honeycomb layer is that trapped water and other contaminants can accumulate within the cells and add considerable weight to the jet engine. Moreover, the water trapped in the honeycomb cells can freeze and melt because of the temperature extremes experienced by a jet engine as an aircraft changes altitudes between takeoff and landing. Such freezing and melting can cause both the honeycomb layer and the bulk absorber to break up or fracture. Additionally, trapped water and other contaminants reduce the noise attenuation capabilities of bulk absorber materials and, in the extreme, may totally prevent noise suppression. Further, the installation of bulk absorber material in individual honeycomb cells is extremely difficult; and, such installation severely restricts the type of bulk absorber material that can be used.

Because of the disadvantages associated with current methods of using bulk absorber materials in turbine engines, more recent noise reduction efforts have been directed to the development of lightweight, multilayered cellular acoustic panels. In U.S. Pat. No. 3,670,843 entitled "Sandwich Structure", for example, two cellular layers are separated by a porous layer; and, an impervious layer is attached to the outer face of one of the cellular layers. In other multilayered cellular acoustic panels a first layer of cellular material (often a honeycomb layer) is mounted between (and bonded to) an impervious back sheet and a perforated separation sheet; and, a second layer of cellular material is mounted between (and also bonded to) the perforated separation sheet and a perforated face sheet. (See U.S. Pat. No. 3,439,774 entitled "Sound Energy Absorbing Apparatus", U.S. Pat. No. 3,640,357 entitled "Acoustic Linings", and U.S. Pat. No. 3,948,346 entitled "Multi-Layered Acoustic Liner".)

From an acoustical standpoint, the cellular layers of cellular acoustic panels are generally designed to attenuate noise lying within a specific narrow range of frequencies, rather than a broad range of noise frequencies. The volume of the cells, particularly the cell's depth dimension, determines the resonant frequency of the cells and limits the narrow range of frequencies that will be attenuated. It is precisely this characteristic that forms the major disadvantage of prior art multilayered cellular acoustic panels. More specifically, the major disadvantage of the multilayered cellular acoustic panels is that their noise attenuation effectiveness is limited to one or more relatively narrow ranges of frequencies. Noise at frequencies lying outside of the narrow range or ranges of frequencies is only attenuated slightly, if at all. More specifically, as with an electronic circuit filter having a frequency rejection band, the farther the frequency of a signal (e.g., noise) is away from the band, the less the signal is rejected (e.g., absorbed). It is for this reason that prior art cellular acoustic panels are usually multilayered. That is, such panels must include cells of differing depth if a plurality of discrete tones at widely separated frequencies are to be significantly attenuated. While differing cellular size can be achieved by including cells of differing depth in a single layer, such a layer is somewhat difficult to produce. More importantly, since the magnitude of a particular signal that is to be attenuated is a direct function of the number of cells designed to attenuate at the frequency of that signal, reducing the number of cells of a particular depth reduces the magnitude of the attenuation of signals related to that cell depth. It is for these reasons the prior art cellular acoustic panels include a plurality of layers of cells, rather than a single layer.

Another problem will multilayered cellular acoustic panels is that contaminating liquids, such as water, can enter such acoustic panels through the porous face sheets and core separation sheets; and, become trapped in the cells. Trapped liquids have the same three disadvantages in cellular acoustic panels that they have in bulk absorber panels wherein the bulk absorber is mounted in a honeycomb layer: first, they reduce the noise attenuation attributes of the panels; second, they add unwanted weight to the engine; and, third, freezing and melting of the liquids as the altitude of the aircraft changes may fracture the acoustic panels. To alleviate the problems associated with water entrapment in multilayered cellular acoustic panels, drain slots are typically formed in adjacent walls of the cells. However, drain slots have the disadvantage that they have an unpredictable effect on the attenuation capacity of an acoustic panel.

Another disadvantage of multilayered cellular acoustic panels is that they are generally expensive to manufacture. It is extremely difficult to determine if an adequate bond has been created between the surface of the cells and the central perforated sheets (septum) that separate adjacent cellular layers. A visual inspection is impossible because the septum sheet is hidden between the cellular layers; and no reliable test equipment is available. Additionally, the acceptable percent of open area in the perforated sheets separating cellular layers is low and must be held within fairly narrow tolerances. For example, in one type of cellular acoustic panel suitable for use in turbine engines, the allowable percent of open area in the perforated sheet separating two cellular layers must lie between 3% and $4\frac{1}{2}$%. It is extremely difficult to meet this requirement because, when bonding the layers to the perforated separating sheets, it is almost impossible to predict how many openings will be closed by the interfaces of cell walls and the bonding material. That is, bonding resin cannot be applied and cured in a manner that will prevent some of the perforated openings from being closed; and, it is impossible to accurately predict how many openings will be closed. As a result, multilayered cellular acoustic panels must be constructed as carefully as possible to ensure that adequate bonding exists between the cellular layers and the perforated sheet separating the layers. Then they must be tested to ensure that the percent of open area in the perforated separation sheets is within tolerances. Multilayered cellular acoustic panels that do not meet both of these criteria must be rejected. When many panels fail to meet both criteria and must be rejected, production costs are significantly increased.

It is therefore an object of this invention to provide a new and improved acoustic panel.

It is also an object of this invention to provide a new and improved acoustic panel that is suitable for use in turbine engines.

It is another object of this invention to provide a new and improved acoustic panel suitable for use in turbine engines that can effectively attenuate noise over a broad range of frequencies.

It is a further object of this invention to provide a new and improved acoustic panel suitable for use in turbine engines that has maximum noise attenuation characteristics over selective frequency ranges and significant noise attenuation characteristics over the entire range of frequencies produced by a turbine engine.

It is a further object of this invention to provide a new and improved acoustic panel suitable for use in turbine engines that is inexpensively manufactured and easily tested, and that is able to stand up to the severe environments existing within a turbine engine.

SUMMARY OF THE INVENTION

The present invention overcomes the problems and disadvantages of the prior art by providing higher percentage acoustically effective area combination bulk absorber-honeycomb acoustic panels. The combination bulk absorber-honeycomb acoustic panels of this invention are sandwich structures comprising a broadband noise-suppressing bulk absorber layer mounted between a back sheet and a perforated septum; and, a noise-suppressing honeycomb layer mounted between the septum and a perforated face sheet.

The combination bulk absorber-honeycomb acoustic panel of the invention provides both broadband and selective frequency noise attenuation. Selective frequency noise attenuation is primarily provided by the honeycomb layer; and, broadband attenuation is provided by the bulk absorber layer. Combination acoustic panels formed in accordance with the invention are mounted in a turbine engine such that the bulk absorber layers are protected from the high speed airflow existing within the engine by the face sheet, the honeycomb layer and the septum sheet. If liquid contaminants enter the honeycomb layer through the perforated face sheet, the liquids will drain into the bulk absorber layer (via the perforations in the septum sheet). Due to gravity, liquids entering the bulk absorber layer will seek the lowest region of the relatively large acoustic panels of the invention, wherefrom they can be readily drained out of the engine. Thus, the noise attenuation characteristics of the honeycomb layer are not inhibited by liquid retention. Moreover, the potentially damaging effect of liquid trapped in the honeycomb layer of the overall combination acoustic panel is eliminated.

It is the structural strength provided by the honeycomb layer that allows the combination bulk absorber-honeycomb acoustic panels to the manufactured in larger unsupported sizes, thus providing higher percentages of effective acoustic area than was previously practical for bulk absorber panels. That is, because the panels can be produced in larger unsupported sizes, less stiffening support members are required to support the combination acoustic panels of the invention within a turbine engine. Thus, weight is reduced. Also, the available effective surface area for noise attenuation in the jet engine is maximized.

It has been found that the critical tolerance requirements of prior art multilayered cellular acoustic panels, discussed above, are substantially lessened for the honeycomb layer of a combination bulk absorber-honeycomb acoustic panel formed in accordance with the invention, without a significant loss of attenuation over the narrow range of frequencies that the honeycomb layer is designed to attenuate. More specifically, rather than requiring that the percent open area in the septum sheet lie in the 2-3% range, this range is extended upwardly and expanded to 5-20%. This relatively broad range of acceptable open area in the spectrum sheet significantly reduces the cost of manufacturing the combination acoustic panels of the invention because precision bonding techniques requiring highly skilled personnel are no longer required. Even though bonding precision and employee skill requirements are reduced, the rejection rate of the combination bulk absorber-honeycomb panels based upon unacceptable covering of septum openings is not increased. Rather, the rejection rate is significantly reduced. Further, the quality of the bonds between the face sheet and the honeycomb layer, and between the septum sheet and the honeycomb layer, can be easily inspected using, for example, a conventional discontinuity sensor because the outer faces of the face and septum sheets are directly accessible during the formation of the panels. Contrariwise, discontinuity sensors are not usable when a bonding layer is remote from the sensor as in the case with multilayered cellular acoustic panels.

In addition to raising and expanding the septum percent open area tolerance, the cell size (depth) range of the honeycomb layer of combination bulk absorber-honeycomb acoustic panels formed in accordance with the invention are substantially greater than the cell size (depth) range of prior art multilayered cellular acoustic panels. As a result, the honeycomb layer of different panels can be formed of a honeycomb of constant cross-sectional size, with the thickness of the layer being varied as necessary to meet the loads occurring in different regions of a turbine engine. Further, bulk absorber material can be easily replaced, if required, by merely removing the back sheet and replacing the bulk absorber layer. Such a change is readily accomplished without damage to the other elements of a bulk-absorber-honeycomb acoustic panel formed in accordance with the invention.

BRIEF DESCRIPTION OF THE DRAWINGS

The foregoing objects and many of the attendant advantages of this invention will become more readily appreciated by reference to the following detailed description and the accompanying drawings, which are incorporated in and constitute part of the specification, wherein:

FIG. 1 is an enlarged, fragmentary, isometric view of a combination bulk absorber-honeycomb acoustic panel formed in accordance with this invention;

FIG. 2 is a partial, cross section view of a combination bulk absorber-honeycomb acoustic panel formed in accordance with this invention;

FIG. 3 is a cross section view of the forward end of a fan-jet engine illustrating the location of combination bulk absorber-honeycomb acoustic panels in the inlet and the fan air duct;

FIG. 4 is a partial, cross-sectional view of FIG. 3 taken along line 4—4;

FIG. 5 is an enlarged, fragmented, cross-sectional view of the edges of two combination bulk absorber-honeycomb acoustic panels fastened to a support structure;

FIG. 6 is an enlarged, longitudinal, cross-sectional view of a combination bulk absorber-honeycomb acoustic panel mounted in the inlet wall of a jet engine;

FIG. 7 is a table illustrating the preferred general ranges of the most significant parameters of combination bulk absorber-honeycomb acoustic panels formed in accordance with the invention for use in a fan jet engine; and, FIG. 8 is a table that lists the specifications of combination bulk absorber-honeycomb acoustic panels formed in accordance with the invention for use in a Pratt and Whitney JT9D-7F jet engine.

DETAILED DESCRIPTION

The invention, as shown in FIG. 1 and 2, is a combination bulk absorber-honeycomb acoustic panel, generally designated 10. The combination bulk absorber-honeycomb acoustic panel 10 is a sandwich comprising: a bulk absorber layer 12 mounted between a back sheet 14 and a perforated septum or dividing sheet 16; and, a honeycomb core type layer 20 mounted between (and bonded to) and perforated septum sheet 16 and a perforated face sheet 22. The bulk absorber layer 12 is formed of a broadband noise-suppressing bulk absorber material that can be generically described as a finely divided felted or woven material, either organic or inorganic, having a high space-to-solid material ratio. Suitable bulk absorber materials are porous ceramics, goose down, steel wool, KEVLAR and SCOTFELT. (KEVLAR and SCOTFELT are federally registered U.S. trademarks of E.I. duPont de Nemours & Co. and Scott Paper Co., respectively). Preferably, the bulk absorber material is capable of attenuating noise in the range of 50 to 10,000 Hertz. (While acoustic panels formed in accordance with the invention were designed for use in jet engines, obviously they can be used in different environments. In such a case, the bulk absorber material will be chosen to cover the frequency range and environment determined by such other usage).

The honeycomb layer comprises a honeycomb formed either of cells of constant cross-sectional area, or varying cross-sectional area, depending upon whether one or more narrow range of frequencies is to be attenuated by the honeycomb layer. In the illustrated embodiment of the invention of the honeycomb cells are of uniform dimensions and have a hexagonal cross-sectional shape. Since different shapes, as well as diferent dimensions can be used, this illustration is intended to be exemplary, not limiting.

FIG. 2 illustrates that the edges of the bulk absorber layer 12 are enclosed by an edge stiffener, which may take the form of a high density honeycomb 24. The edge stiffener is bonded to the septum 16 and lies between the septum and the backing sheet 14. Thus, the edge stiffener, backing sheet and septum define a cavity which contains the bulk absorber layer 12. Since the high density honeycomb 24 entirely surrounds the bulk absorber layer 12, all of the peripheral edges of the combination panels of the invention are stiff. As will be understood from the following discussion, this peripheral stiffness allows the panels to be attached to structural support members by bolts, without the edges of the panels compressing, as would be in the case if bulk absorber material extended to the edges of the panels.

An exemplary illustration of the location of combination bulk absorber-honeycomb acoustic panels in a typical fan-jet engine 30 is shown in FIG. 3. As will be readily understood by those skilled in the jet engine art, a fan-jet engine 30 includes: an inlet 33; and, a fan air duct 36 that surrounds a turbine 35. The inlet and the fan air duct are generally defined by a nacelle. The inlet directs air toward the fan air duct 36, past a fan 32 driven by the turbine 35. The fan 32 slightly compresses the air before it enters the fan air duct 36.

In accordance with this invention, a plurality of combination bulk absorber-honeycomb acoustic panels 10a, b, c, d, e and f form part or all of the wall 34 of the inlet; and part or all of the outer and inner walls 37 and 38 of the fan air duct 36. In general, buzz saw noise and forward radiated fan noise are attenuated by the combination bulk absorber-honeycomb acoustic panels forming the wall 34 of the inlet 33. Aft radiated fan noise is attenuated by the combination panels forming the outer and inner walls 37 and 38 of the fan air duct 36.

The combination bulk absorber-honeycomb acoustic panels are oriented in the inlet 33 and the fan air duct 36 such that the outer face of the perforated face sheet 22 of the panels face the interior of the inlet and the fan air duct. Therefore, the bulk absorber layer 12 is protected by the face sheet 22, honeycomb layer 20 and septum sheet 16. As a result, high speed, pressurized air flowing through the inlet and fan air duct cannot impinge directly on the bulk absorber layer 12. Consequently, the possibility that such airflow will damage the bulk absorber layer is extremely low.

The inclusion of a honeycomb layer results in a panel that has a high degree of structural stiffness. It is the stiffness provided by the honeycomb layer 20 that allows large combination bulk absorber-honeycomb acoustic panels to be formed and used in a fan-jet engine with a minimal number of support members. For example, in one actual embodiment of the invention, circumferentially, the wall 34 of the inlet 33 of a fan-jet engine was formed of three combination bulk absorber-honeycomb acoustic panels. As a result, longitudinally, only three support stringers 50 were required, as shown in FIG. 4.

FIG. 5 illustrates the preferred way of attaching combination bulk absorber-honeycomb acoustic panels to certain support members, such as the stringers 50 illustrated in FIG. 4. In this regard, the illustrated stringer 50 is T-shaped when viewed in cross section, whereby if it includes a crossmember 51a and a leg 51b, the edges of two panels abut one another atop the cross-member 51a of the T-shaped stringer such that the joint between the panels is generally in line with the leg 51b of the stringer. A plurality of bolts 62, which extend through the edges of the panels (specifically, through the region of the high density honeycomb located about the bulk absorber layer 12) and the cross-member 51a of the stringer 50, attach the edges of the combination panels to the stringer. Preferably, the edge of one of the combination panels tapers outwardly to provide a tapered cutaway escape aperture 61 that permits easy installation and removal of the combination panels in a circumferential ring application, as shown in FIG. 5.

In the exemplary fan-jet engine illustrated in FIG. 3, in the longitudinal direction, wall 34 of the inlet 33 is lined with constant section combination panels 10a, formed in accordance with this invention. The combination panels 10a extend along the full length of the inlet. The outer wall 37 of the fan air duct 36 includes interstage, outer fan case and fan duct sleeve sets of combination panels 10b, 10c and 10d. The inner wall 38 of the fan air duct 36 includes inner fan case and fan duct diaphragm sets of combination panels 10e and 10f. As with the inlet set of panels, each set of each section of the outer and inner walls of the fan air duct circumferentially may comprise three panels of equal size. (Or a greater number, if desired.)

In addition to attaching the longitudinal edges of each combination panel to a stringer, as illustrated in FIG. 4, and previously described, the curved transverse edges of the combination panels are supported by rings. By way of example, the rings supporting the curved edges of the fore and aft sets of combination panels 10a of the wall 34 of the inlet 33 are illustrated in FIG. 6 and next described.

Referring now to FIG. 6, the set of inlet combination panels 10a begin at a point just aft of the leading edge of the inlet and extend rearwardly. The leading edge of this set of combination panels abuts the vertical leg and a horizontal leg of a forward mounting ring 54. More specifically, the forward mounting ring 54 has a straightened Z-shape when viewed in cross section. The leading edge of this set of combination panels 10a lies in the angle formed between a vertical leg and the outer horizontal leg of the forward mounting ring 54. The inner horizontal leg lies coplanar with the surface of the combination panel facing the interior of the inlet. The leading edge of the panels is fastened to the Z-shaped forward mounting ring 54 by bolts (not shown) that extend through the edges of the panels and the outer horizontal leg of the circumferential forward mounting ring 54. The aft end of the set of inlet combination panels 10a terminate at an aft circumferential mounting ring 55. A midring 52, T-shaped in cross section, may be included to provide midpanel support if required. The panels are attached to the midring 52 in the same manner they are attached to the stringers 50, i.e., by bolts (not shown). The aft mounting ring 55 has a cross-sectional shape similar to the forward ring 54. Attachment is in the same manner, i.e., by bolts (not shown) that extend through the edge of the panels and an outer horizontal leg of the aft ring.

While a preferred method of attaching the inlet combination bulk absorber-honeycomb acoustic panels to structural support members e.g., stringers and rings, has been described, it will be appreciated that other fastening methods can be used. Furthjer, the panels can be attached to different types of support members. Moreover, the various sets of combination panels forming the inner and outer walls of the fan air duct 36 may be mounted to stringers and rings in the same manner, or in different manners, as dictated by the particular type of engine with which the invention is being used.

As will be readily appreciated by those familiar with fan-jet engines from the foregoing description, water or other liquids that are trapped in the cells of the honeycomb layer will flow through the holes in the septum into the bulk absorber layer. Because the bulk absorber layer is porous, gravity will cause such liquids to seek the lower regions of the bulk absorber layer from whence they can be easily drained, via a drain mounted in the adjacent region of the back sheet, for example.

With respect to actual embodiments of the invention, the back sheet 14 is preferably formed of a sound impervious, solid material such as aluminum sheet strong enough not to be ruptured by pressure loads created in the bulk absorber layer 12 by the airflow in the inlet and fan air duct. The honeycomb layer 20 is preferably a hexagonally-shaped honeycomb having a commonly used ⅜" cell size. However, if desired, other cell shapes and sizes may be used. The high density honeycomb 24 located about the edge of the bulk absorber layer (which controls the depth of the bulk absorber layer) is preferably a hexagonal core having ¼" or smaller cell size. More generally, the table illustrated in FIG. 7 lists the preferred ranges for the most significant parameters. Further, FIG. 8 lists the specifications of combination bulk absorber-honeycomb acoustic panels actually constructed and tested for incorporation in a nacelle used in conjunction with a Pratt and Whitney JT0D-7F engine.

The combination bulk absorber-honeycomb acoustic panels 10 constructed for use in the aforementioned nacelle, were assembled by first bonding the face sheet 22 and the septum sheet 16 to the honeycomb layer 20 with an adhesive bonding resin. As will be readily understood by those familiar with bonding honeycombs to perforated sheets, during bonding, some of the perforations are closed; and, it is impossible to accurately predict how many perforations will be closed. However, because the range of acceptable open area in the septum 16 and the face sheets, as shown in FIG. 8, is large (in comparison to the narrow range allowable in the manufacture of multilayered honeycomb cellular panels), a wide variation in the number of perforations that can be closed was allowable. Furthermore, the bonds formed were easily inspected and tested using conventional apparatus since one surface of both the face sheet 22 and septum sheet 16 was directly accessible to test apparatus. Subsequent to testing the bonds, the broadband noise-suppressing bulk absorber layer 12 was placed on the septum sheet 16 and the edge high density honeycomb 24 was placed around the bulk absorber layer 12 and bonded to the septum 16 with an adhesive bonding resin. The back sheet 14 was then placed over the bulk absorber layer 12 and bolt fasteners installed through the honeycomb panel and the edge high density honeycomb 24 to secure the back sheet 14 to the assembly.

As will be appreciated by those skilled in the art and others from the foregoing description, combination bulk absorber-honeycomb acoustic panels formed in accordance with this invention are versatile, structurally strong, noisesuppressing panels that are suitable for forming the walls of the inlet and fan air duct of a fan-jet engine. The combination bulk absorber-honeycomb acoustic panels have the advantage of significantly attenuating noise within specific frequency ranges, without the disadvantage of high manufacturing costs and inspection problems, plus the advantage of attenuating broadband noise such as buzz saw noise. Panels formed in accordance with the invention are readily designed such that the honeycomb layer will absorb a substantial portion of high magnitude noise in one or more narrow frequency ranges, such as forward and aft generated fan noise. This noise will be further absorbed by the bulk absorber layer, which will also absorb other noise, such as buzz saw noise.

While a preferred embodiment of this invention has been illustrated and described, it will be appreciated that various changes can be made therein without departing from the spirit and scope of the invention. Hence, the invention can be practiced otherwise than as specifically described herein.

The embodiments of the invention in which an exclusive property or privilege is claimed are defined as follows:

1. A combination bulk absorber-honeycomb acoustic panel comprising:
   an impervious back sheet;
   a perforated septum sheet;
   a broadband noise-suppressing bulk absorber layer mounted between said back sheet and said septum sheet;
   a perforated face sheet; and
   a rigid noise-suppressing honeycomb layer mounted between said septum sheet and said face sheet.

2. The acoustic panel claimed in claim 1 wherein the thickness of said honeycomb layer lies in the range between about 0.125 inch and about 0.75 inch.

3. The acoustic panel claimed in claim 2 wherein the percent open area of said perforated septum lies in the range between about 10% and about 20%.

4. The acoustic panel claimed in claim 3 wherein the density of said bulk absorber layer lies in the range between about 6 and 9 pounds per cubic foot, and the thickness of said bulk absorber is greater than 0.45 inch.

5. The acoustic panel claimed in claim 4 wherein the percent open area of said perforated face sheet is greater than 19%.

6. The acoustic panel claimed in claim 1 wherein the percent open area of said perforated septum lies in the range between about 10% and about 20%.

7. The acoustic panel claimed in claim 6 wherein the density of said bulk absorber layer lies in the range between about 6 and 9 pounds per cubic foot, and the thickness of said bulk absorber is greater than 0.45 inch.

8. The acoustic panel claimed in claim 7 wherein the percent open area of said perforated face sheet is greater than 19%.

9. The acoustic panel claimed in claim 1 wherein the density of said bulk absorber layer lies in the range between about 6 and 9 pounds per cubic foot, and the thickness of said bulk absorber is greater than 0.45 inch.

10. The acoustic panel claimed in claim 9 wherein the percent open area of said perforated face sheet is greater than 19%.

11. The acoustic panel claimed in claim 1 wherein the percent open area of said perforated face sheet is greater than 19%.

12. In a fan jet engine having a fan and ducting for directing air past said fan, said ducting defined by an inlet wall located forward of said fan and fan air duct outer and inner walls located aft of said fan, the improvement comprising: combination bulk absorber-honeycomb acoustic panels forming at least a portion of, said inlet wall and/or said fan air duct outer and inner walls for attenuating noise produced by said jet engine including buzz saw noise, forward radiated fan noise and aft radiated fan noise, each of said combination bulk absorber-honeycomb acoustic panels comprising:

an impervious back sheet;
a perforated septum sheet;
a broadband noise-suppressing bulk absorber layer mounted between said back sheet and said septum sheet;
a perforated face sheet; and
a rigid noise-suppressing honeycomb layer mounted between said septum sheet and said face sheet, said face sheet being substantially flush with said inlet wall and said fan air duct outer and inner walls.

13. The improvement claimed in claim 12 wherein the thickness of said honeycomb layer lies in the range between about 0.125 inch and about 0.75 inch.

14. The improvement claimed in claim 13 wherein the percent open area of said perforated septum lies in the range between about 10% to about 20%.

15. The improvement claimed in claim 14 wherein the density of said bulk absorber layer lies in the range between about 6 and 9 pounds per cubic foot, and the thickness of said bulk absorber is greater than 0.45 inch.

16. The improvement claimed in claim 15 wherein the open area of said perforated face sheet is greater than 19%.

17. The improvement claimed in claim 12 wherein the percent open area of said perforated septum lies in the range between about 10% to about 20%.

18. The improvement claimed in claim 17 wherein the density of said bulk absorber layer lies in the range between about 6 and 9 pounds per cubic foot, and the thickness of said bulk absorber is greater than 0.45 inch.

19. The improvement claimed in claim 18 wherein the open area of said perforated face sheet is greater than 19%.

20. The improvement claimed in claim 12 wherein the density of said bulk absorber layer lies in the range of between about 6 and 9 pounds per cubic foot, and the thickness of said bulk absorber is greater than 0.45 inch.

21. The improvement claimed in claim 20 wherein the open area of said perforated face sheet is greater than 19%.

22. The improvement claimed in claim 12 wherein the open area of said perforated face sheet is greater than 19%.

* * * * *